Jan. 28, 1941.　　　　　J. P. MINTON　　　　2,230,002
METHOD OF CALIBRATING FIELD TIMING SYSTEMS
Filed Nov. 17, 1937　　　2 Sheets-Sheet 1
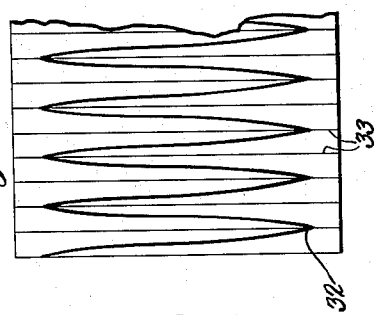
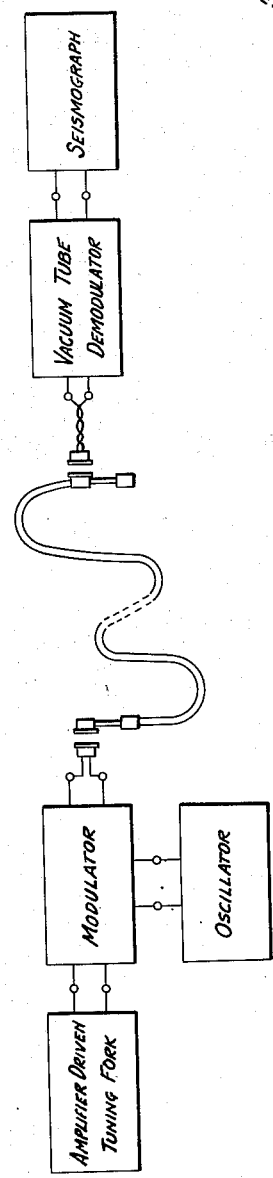
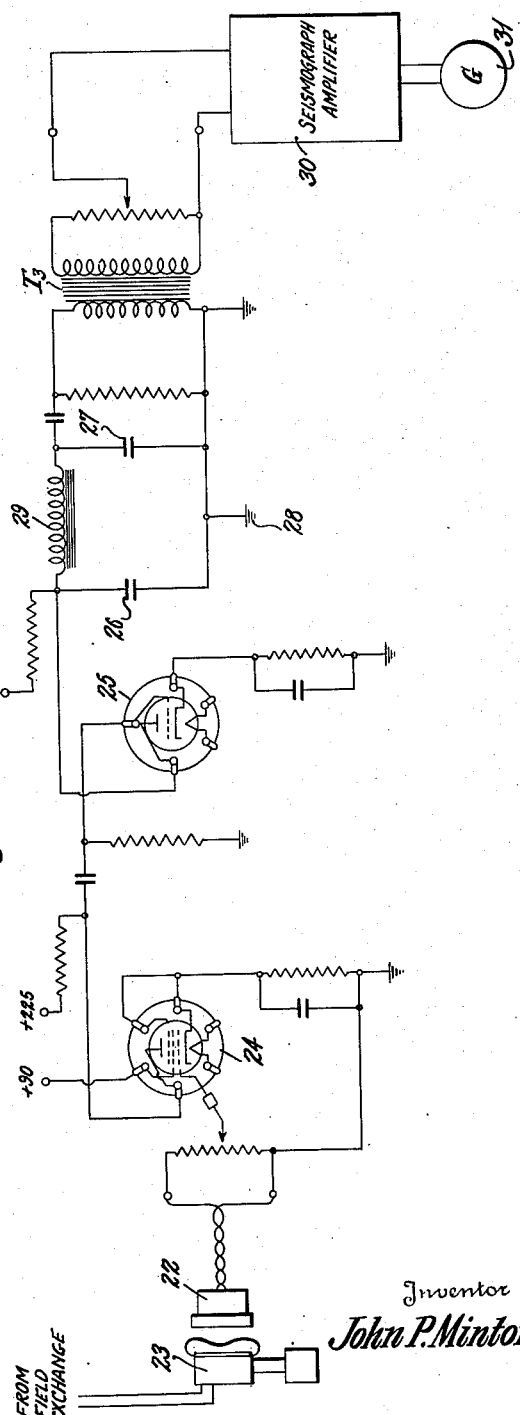
Inventor
John P. Minton
By Dallas R. Lamont
Attorney Jan. 28, 1941. J. P. MINTON 2,230,002
METHOD OF CALIBRATING FIELD TIMING SYSTEMS
Filed Nov. 17, 1937 2 Sheets-Sheet 2
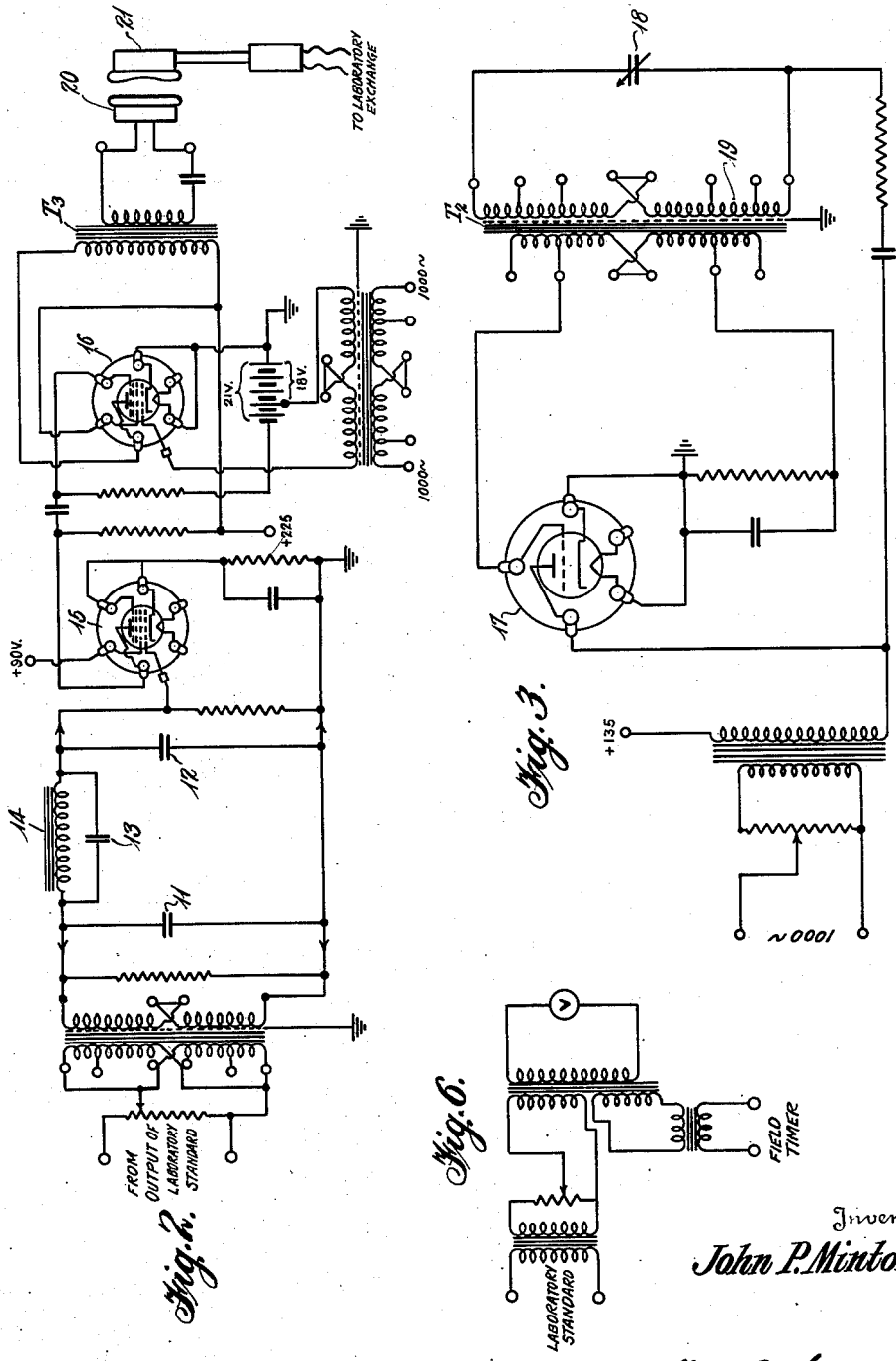
Inventor
John P. Minton
By Dallas R. Lamont
Attorney Patented Jan. 28, 1941

2,230,002

UNITED STATES PATENT OFFICE 2,230,002

METHOD OF CALIBRATING FIELD TIMING SYSTEMS

John P. Minton, Dallas, Tex., assignor, by mesne assignments, to Socony-Vacuum Oil Company, Incorporated, New York, N. Y., a corporation of New York Application November 17, 1937, Serial No. 174,971

1 Claim. (Cl. 73—51)

This invention relates generally to seismographic surveying methods and to apparatus for placing these methods into practice, and more particularly to a method and means for checking and correcting field timing devices used for recording time intervals accurately to a very small fraction of a second in geophysical exploration work.

In the art of subsurface surveying or geophysical exploration by means of the electric seismograph, it is necessary that some means be provided whereby definite small intervals of time can be measured accurately to within one-thousandth of a second. In order to ascertain definitely the period of time that has elapsed between the detonation of a charge used to generate seismic waves and the time at which the various waves arrive at some detecting means, timing means are provided which project a light ray to a continuously moving sensitized paper or photographic film at definite time intervals, the interval between the projection of successive beams on the paper being usually one-fiftieth or one-hundredth of a second. The cross-section of this projected beam is so controlled that at the time it strikes the sensitized paper, it exposes a thin straight transverse line across the paper. At the same time light beams are being reflected from the vibrating elements of a galvanometer also exposing the paper and resulting in a seismogram that will have, in addition to the timing lines at definite intervals, longitudinal traces showing wave trains that have been generated in sympathy with and by the seismic waves.

Inasmuch as these timing lines are placed on the sensitized paper or photographic film, sometimes at intervals as small as one-hundredth of a second, and it is desired to estimate an instant of time to one-thousandth of a second, it becomes of vital importance that there be no variation in the frequency of the apparatus which produces these timing lines.

Devices used to date for placing these timing lines on a seismogram include a synchronous motor driven by a pulsating current from an electrically driven fork, a vibrating reed having a shutter mounted thereon for intercepting the light beam and driven by a carbon button fork, and other well known means, which utilize in every instance, some frequency generator in the form of a fork or reed. These being of metal, they are subject to inaccuracies due to changes in temperature. The co-efficient of expansion of most metals is sufficiently great that a variation in temperature of a very few degrees will effect a sufficient change in the frequency of the fork to cause errors which, in over all periods of time required for the seismic waves to travel from the point of generation to their point of detection, are in many cases greater than one-thousandth of a second. Such errors introduced into the computation of results may give rise to mistakes in calculation of depth of as much as fifty feet. Therefore, it is important that some means be provided whereby the frequency generators in electrical seismographic equipment can be checked periodically.

Heretofore it has been necessary either to carry a standard from the laboratory to the instrument in the field, or bring the field instrument into the laboratory at frequent intervals for the purpose of comparing the field frequency generator with that of the laboratory standard. This method, however, has proved to be impracticable, particularly when the seismograph parties in the field may be located at various places throughout the country and even in foreign countries.

It is a primary object of this invention to provide means whereby a field party can quickly and accurately check its frequency generator against that of the standard located permanently in the laboratory from virtually any place in the world at any time upon short notice or at prearranged intervals.

It is a further object of this invention to provide means whereby such a check can be made by telephone.

A still further object of this invention is in the provision of means whereby such a check can be effected by radio.

This invention further contemplates a method of calibrating frequency generators, remotely positioned with respect to a laboratory standard, that will be accurate and economical.

It is another object of this invention to provide means whereby a signal may be transmitted over a regular telephone system without making any physical circuit connections to the telephone system.

Still another object of this invention is in the provision of apparatus for the purposes above stated which can be used in connection with any conventional electrical seismographic equipment.

Still another object of this invention is the transmission of a standard signal, by using it to modulate a relatively high frequency signal, to a remote point where it is demodulated and the standard signal recorded.

Other objects and advantages of this invention become apparent from the following detailed description when considered with the attached drawings, in which:

Figure 1 is a block diagram of the system illustrating the means by which the frequency of the laboratory standard is transmitted to and utilized by the field apparatus.

Figure 2 shows a modulating circuit that may be used for modulating a high frequency wave with a relatively low frequency wave.

Figure 3 is a diagram of an oscillator circuit which may be utilized to generate any predetermined frequency of the order of say 1000 cycles.

Figure 4 shows a demodulating circuit by means of which a high frequency wave when modulated by a relatively low frequency wave can be demodulated.

Figure 5 is an illustration of a seismograph record, showing the laboratory standard wave superimposed on the timing lines that have been recorded from the field timing apparatus.

Figure 6 is a diagram of a circuit by means of which the field timing device may be compared by the beat method to that of the laboratory standard.

An alternating current, from the laboratory standard is delivered to a conventional M-type filter in Figure 2 comprising the condensers 11, 12 and 13, and the choke 14. The M-type filter is a low pass filter and will block out any frequencies higher than 50 cycles, which would tend to distort the wave. The wave of standard frequency passing through the M-type filter is again amplified by the vacuum tube 15, is then impressed on the grid of a vacuum tube 16, and is here used as a modulating voltage for a high frequency carrier wave, the frequency of which has been selected well within the range of audible frequencies that can be transmitted over conventional telephone networks, say 1000 cycles per second. A high frequency carrier wave of definite frequency for this purpose can be generated by an oscillator vacuum tube 17, with the circuit shown in Figure 3. The oscillating circuit associated with this tube 17 is of conventional design, and a carrier wave of predetermined frequency can be generated by varying the capacity of the condenser 18 with respect to the inductance 19. A potentiometer may be inserted in the circuit across the secondary of the transformer T₂ if desired for the purpose of controlling the amplitude of the high frequency carrier wave. This high frequency carrier wave, upon being passed through the vacuum tube 16 (Figure 2), is modulated by the low frequency voltage from the laboratory standard, and the modulated wave is passed through an audio transformer T₃ to a standard telephone receiver unit 20, or other device, such as a conventional loud speaker. The high frequency note modulated by the laboratory standard is well within the audio range and can be transmitted over a telephone system in the same manner that the voice is transmitted in ordinary telephone conversation.

Then by merely holding the standard telephone receiver unit or loud speaker 20 before the microphone 21 of a conventional telephone unit, the modulated high frequency wave can be transmitted to any station in the country or world with which telephone or radio communication can be established.

At the point where the field unit is located, it is necessary to receive, by telephone or radio telephone, this high frequency wave which has been modulated by a laboratory standard of low frequency and demodulate the wave and eliminate the high frequency carrier wave and record only the frequency of the laboratory standard. In order to accomplish this, the standard telephone receiver unit 23 in the field, as shown in Figure 4, is held before, and in close proximity to, a microphone 22. The microphone 22, as has been found by experimentation, can be replaced by a conventional headset telephone receiver, such as the "Baldwin" type, if desired. The microphone 22 will pick up from the conventional telephone receiver unit 23, the modulated high frequency wave originating in the home laboratory and impress it on a vacuum tube 24 where it will be amplified. The amplified wave is then brought into the grid of a detector or demodulating tube 25. The modulations of the high frequency wave on the grid of the detector tube will serve as a control for the plate current flowing between the tube plate element and the cathode and will modulate the plate current at the frequency of the laboratory standard. The plate current from the detector tube is then passed through a K-type filter, which through the condensers 26 and 27 will by-pass any high frequency waves to the ground 28, and there will be flowing through the choke 29 only a current of the modulation frequency which is that of the laboratory standard. This current of the modulation or laboratory standard frequency is then impressed across the primary of a transformer T₃. The secondary of the transformer T₃ is then connected through a conventional amplifier or through a conventional seismograph amplifier 30, to a seismograph galvanometer 31, where the trace of the laboratory standard frequency is recorded on a moving sensitized paper or photographic film. The moving sensitized paper or photographic film will at the same time that it records the frequency of the laboratory standard, have exposed thereon, timing lines controlled by the timer in the field equipment, whose frequency it is desired to check or compare. The record thus produced will be as illustrated in Figure 5. The wave 32 recorded will have the frequency of the laboratory standard and the timing lines 33, which are transversely recorded on the paper or film, will be at time intervals corresponding to the frequency of the field timing device. In this manner a permanent record is made having the frequency of the laboratory standard superimposed on indications of the frequency of the field timing device.

Since the entire operation of checking the field timing device or fork against that of the laboratory standard can be completed well within the conventional telephone toll period of three minutes, the tremendous saving in time and expense becomes readily apparent.

Although this system has been described in connection with a telephone system, it should be noted that there is no electrical connection of any character made to the telephone system.

In addition to our conventional telephone system, this invention, as well, has application to radio sending and receiving apparatus, and can be used between stations wherever radio telephone communication can be established, in a similar manner.

The use of a conventional electrical seismograph amplifier for purpose of recording the standard frequency waves on the galvanometer, is optional, for in some instances it is possible to apply the standard wave directly to the vibrating element of a galvanometer.

The invention described thus far is adapted to use in checking or comparing a laboratory standard of known frequency with the frequency of a fork or timing device in seismographic field apparatus. This invention has further application as illustrated in Figure 6, in that it can be used for actually adjusting the fork or timing device used in the field. This is accomplished, as shown by the circuit diagram, by impressing both the standard frequency wave and the wave generated by the field timing device on the primary of a transformer, then connecting across the secondary of this transformer a meter V, such as a voltmeter. Then if there is a difference in the frequencies impressed upon the primary of the transformer, a beat will be produced in the secondary that will be indicated by the meter V. By making adjustments to the field frequency generator, a frequency can be obtained which will coincide with that of the laboratory standard, this condition having been attained when no beat occurs on the meter V. This application of the invention affords the operator in the field a means whereby his timing device can be corrected to the accuracy of the laboratory standard with minimum difficulty and as often as desired. The accuracy of the beat method is much greater than that of the record method, which requires taking a photograph of the laboratory standard frequency at the recording truck. This applies to comparing two frequencies as well as to adjusting the field timer to synchronism with the laboratory standard.

I claim:

The method of frequency calibrating a timing mechanism located at a point remote from a master frequency timing mechanism that comprises generating a signal of a standard frequency controlled by the master timing mechanism and of too low a frequency to be readily transmitted by a conventional audio frequency telephone system, modulating said standard frequency signal onto a carrier wave of an audio frequency sufficiently high to be readily transmittable by such a conventional audio frequency telephone system, transmitting said modulated carrier wave over a conventional audio frequency telephone to the point of location of the timing mechanism to be calibrated, demodulating the carrier wave to obtain the standard frequency signal and calibrating the timing mechanism by use of said standard frequency signal.

JOHN P. MINTON.